US010220768B2

(12) United States Patent
Damon

(10) Patent No.: US 10,220,768 B2
(45) Date of Patent: Mar. 5, 2019

(54) PLATOONING LIGHT FENCE SYSTEM AND METHOD

(71) Applicant: Kenneth H. Damon, Fort Worth, TX (US)

(72) Inventor: Kenneth H. Damon, Fort Worth, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/646,998

(22) Filed: Jul. 11, 2017

(65) Prior Publication Data

US 2019/0016255 A1 Jan. 17, 2019

(51) Int. Cl.
| | |
|---|---|
| *B60Q 1/00* | (2006.01) |
| *B60Q 1/50* | (2006.01) |
| *B60Q 9/00* | (2006.01) |
| *F21S 43/31* | (2018.01) |
| *F21S 43/13* | (2018.01) |

(Continued)

(52) U.S. Cl.
CPC ............. *B60Q 1/50* (2013.01); *B60Q 1/0076* (2013.01); *B60Q 1/24* (2013.01); *B60Q 1/28* (2013.01); *B60Q 9/00* (2013.01); *F21S 43/13* (2018.01); *F21S 43/31* (2018.01); *G08G 1/22* (2013.01); *B60Q 1/0035* (2013.01); *B60Q 2400/00* (2013.01); *B60Q 2400/50* (2013.01)

(58) Field of Classification Search
CPC ........ G08G 1/22; B60Q 1/28; B60Q 2400/50; B60Q 1/24; B60Q 1/50; B60Q 1/0035; B60Q 1/0076; B60Q 9/00; B60Q 2400/00; F21S 43/13; F21S 43/43

USPC ......................................................... 362/485
See application file for complete search history.

(56) References Cited

U.S. PATENT DOCUMENTS

| | | | | |
|---|---|---|---|---|
| 3,949,362 A | * | 4/1976 | Doyle ..................... | B60Q 1/525 340/435 |
| 4,706,773 A | * | 11/1987 | Reinaud ............... | A01B 69/001 172/5 |

(Continued)

OTHER PUBLICATIONS

"White Paper: Automated Driving and Platooning Issues and Opportunities," ATA Technology and Maintenance Council Future Truck Program, Automated Driving and Platooning Task Force, Sep. 21, 2015, 48 pages.

(Continued)

*Primary Examiner* — Claude J Brown
(74) *Attorney, Agent, or Firm* — Christensen O'Connor Johnson Kindness PLLC

(57) ABSTRACT

A platooning light fence includes an illumination assembly having one or more light sources located on at least one of a first platooning truck and a second platooning truck, each of the one or more light sources configured to radiate a beam of light that extends substantially continuously between the first and second platooning trucks. A system for deterring passenger vehicles from entering a gap defined between at least a leading platooning truck and a trailing platooning truck includes an illumination assembly having one or more light sources located on at least one of the leading platooning truck and the trailing platooning truck, each of the one or more light sources configured to radiate a beam of light that extends substantially continuously between the leading and trailing platooning trucks, and an activation assembly configured to selectively activate the illumination assembly.

20 Claims, 3 Drawing Sheets

(51) Int. Cl.
*B60Q 1/28* (2006.01)
*B60Q 1/24* (2006.01)
*G08G 1/00* (2006.01)

(56) References Cited

U.S. PATENT DOCUMENTS

| | | | | |
|---|---|---|---|---|
| 5,682,138 | A * | 10/1997 | Powell | B60Q 1/326 |
| | | | | 340/431 |
| 5,923,243 | A * | 7/1999 | Bleiner | B60Q 1/525 |
| | | | | 340/435 |
| 6,032,097 | A * | 2/2000 | Iihoshi | G08G 1/22 |
| | | | | 180/168 |
| 6,133,851 | A | 10/2000 | Johnson | |
| 6,422,728 | B1 * | 7/2002 | Riggin | B60Q 1/16 |
| | | | | 340/475 |
| 6,543,917 | B1 * | 4/2003 | Berlinghof | B60Q 1/24 |
| | | | | 340/932.2 |
| 6,733,134 | B2 * | 5/2004 | Bleiner | B60Q 1/52 |
| | | | | 116/28 R |
| 9,242,596 | B2 * | 1/2016 | Thomson | B60Q 1/24 |
| 9,308,860 | B2 * | 4/2016 | Cha | B60R 3/02 |
| 9,632,507 | B1 * | 4/2017 | Korn | G05D 1/0295 |
| 2002/0070849 | A1 * | 6/2002 | Teicher | B60Q 1/50 |
| | | | | 340/425.5 |
| 2006/0225329 | A1 * | 10/2006 | Morrow | G09F 7/04 |
| | | | | 40/591 |
| 2007/0053195 | A1 * | 3/2007 | Alberti | B60Q 1/2665 |
| | | | | 362/494 |
| 2011/0118967 | A1 * | 5/2011 | Tsuda | B60W 30/10 |
| | | | | 701/117 |
| 2012/0025962 | A1 * | 2/2012 | Toll | B60Q 1/50 |
| | | | | 340/431 |
| 2013/0041576 | A1 * | 2/2013 | Switkes | G08G 1/166 |
| | | | | 701/123 |
| 2013/0211624 | A1 * | 8/2013 | Lind | G05D 1/0278 |
| | | | | 701/2 |
| 2014/0158468 | A1 * | 6/2014 | Adami | B66F 9/0755 |
| | | | | 187/222 |
| 2015/0203023 | A1 | 7/2015 | Marti et al. | |
| 2016/0054735 | A1 * | 2/2016 | Switkes | G08G 1/22 |
| | | | | 701/23 |
| 2017/0227972 | A1 * | 8/2017 | Sabau | G05D 1/0295 |
| 2017/0361762 | A1 * | 12/2017 | Wunsche | B60Q 1/28 |

OTHER PUBLICATIONS

International Search Report and Written Opinion dated Nov. 15, 2018, issued in corresponding International Application No. PCT/US2018/040719, filed Jul. 3, 2018, 7 pages.

* cited by examiner

PLATOONING LIGHT FENCE SYSTEM AND METHOD

BACKGROUND

Truck platooning is well known in the industry to create road trains, where two or more trucks follow each other closely or "draft" off of one another. Trucks in such a convoy drive very close together, significantly reducing aerodynamic drag and increasing fuel-efficiency. The smaller the gap between the vehicles, the better the fuel economy.

Technology is being developed to create semi-autonomous platoons of trucks that are controlled by a lead vehicle through wireless communication. The trucks would constantly maintain a communication link that would allow them to share data and action. For instance, if the lead truck's collision avoidance system activates its brakes, the following truck or trucks would do the same. However, one reason that such automated platooning technology has not yet been implemented is the safety concerns caused by platooning trucks.

Currently trucks do not have dedicated lanes or roads. As such, platooning trucks must share the roadway with passenger vehicles that may be unaware of the "rules" of platooning. Unfortunately, with such a small gap between platooning trucks, cut-offs and cut-ins by passenger vehicles sharing the road are common and dangerous. When a passenger vehicle cuts in between two platooning trucks, the rear truck must respond and brake appropriately to attain a safe following distance behind the encroaching vehicle. Although modern technologies (such as adaptive cruise control) allow a vehicle to sense and respond to a developing crash situation faster than a human driver, the technologies are limited by the speed of the vehicles, the distance between the vehicles, etc. The potential of cut-ins can be reduced by more closely spacing the trucks, however, if a cut-in does occur, it can be an even more critical safety situation than if the trucks were spaced further apart. Increasing the spacing between trucks may provide more time for the rear platooning truck to react to a cut-in, however, the increased spacing encourages more cut-ins and lessens the fuel economy effects of the platoon.

Accordingly, a system and method for increasing the safety of platooning trucks is desired. Such a system and method would beneficially work with trucks of various fleets that either manually draft off one another or that are synced electronically if/when such a system is implemented. Moreover, such a system and method would be beneficially easy and cost-effective to implement on both new and used trucks, as well as easy to use.

SUMMARY

A platooning light fence includes an illumination assembly having one or more light sources located on at least one of a first platooning truck and a second platooning truck, each of the one or more light sources configured to radiate a beam of light that extends substantially continuously between the first and second platooning trucks.

A system for deterring passenger vehicles from entering a gap defined between at least a leading platooning truck and a trailing platooning truck includes an illumination assembly having one or more light sources located on at least one of the leading platooning truck and the trailing platooning truck, each of the one or more light sources configured to radiate a beam of light that extends substantially continuously between the leading and trailing platooning trucks, and an activation assembly configured to selectively activate the illumination assembly.

A method for deterring passenger vehicles from entering a gap defined between at least a leading platooning truck and a trailing platooning truck includes activating an illumination assembly to radiate at least one high intensity beam of light substantially continuously between the leading platooning truck and the trailing platooning truck.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION

Figure 1:
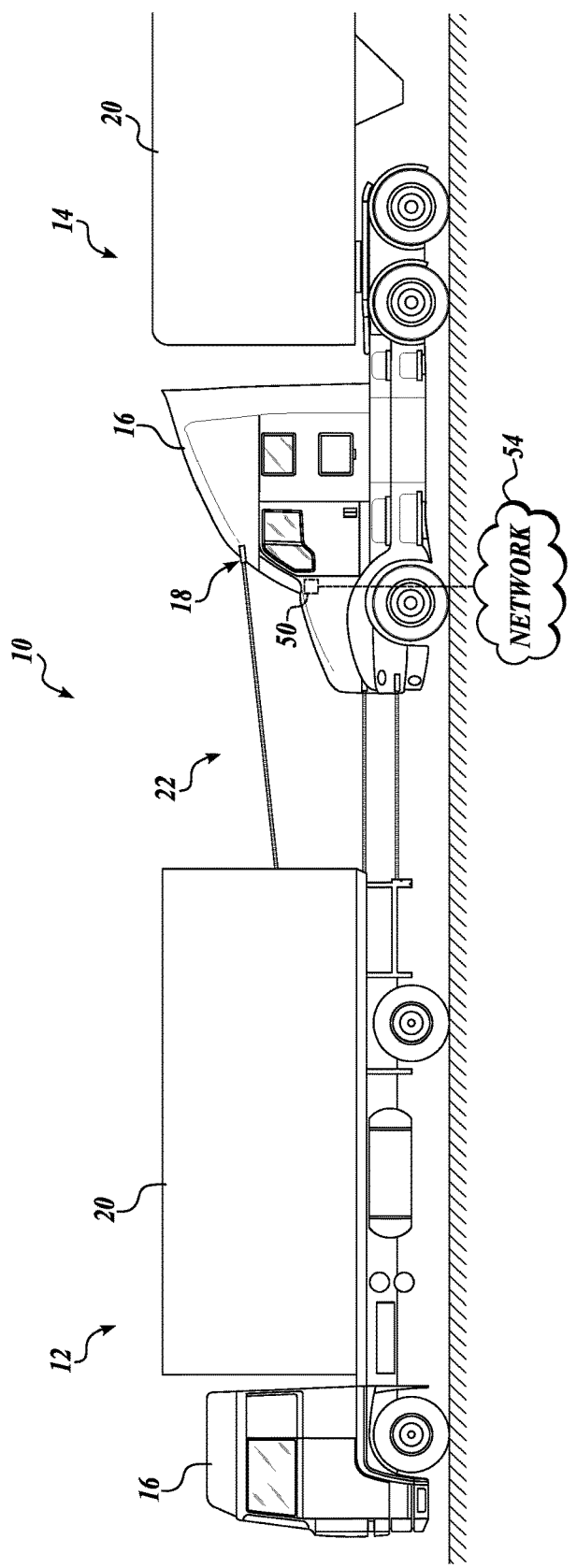
FIG. 1 is an environmental view of a platooning light fence system formed in accordance with an exemplary embodiment of the present disclosure.
Figure 2:
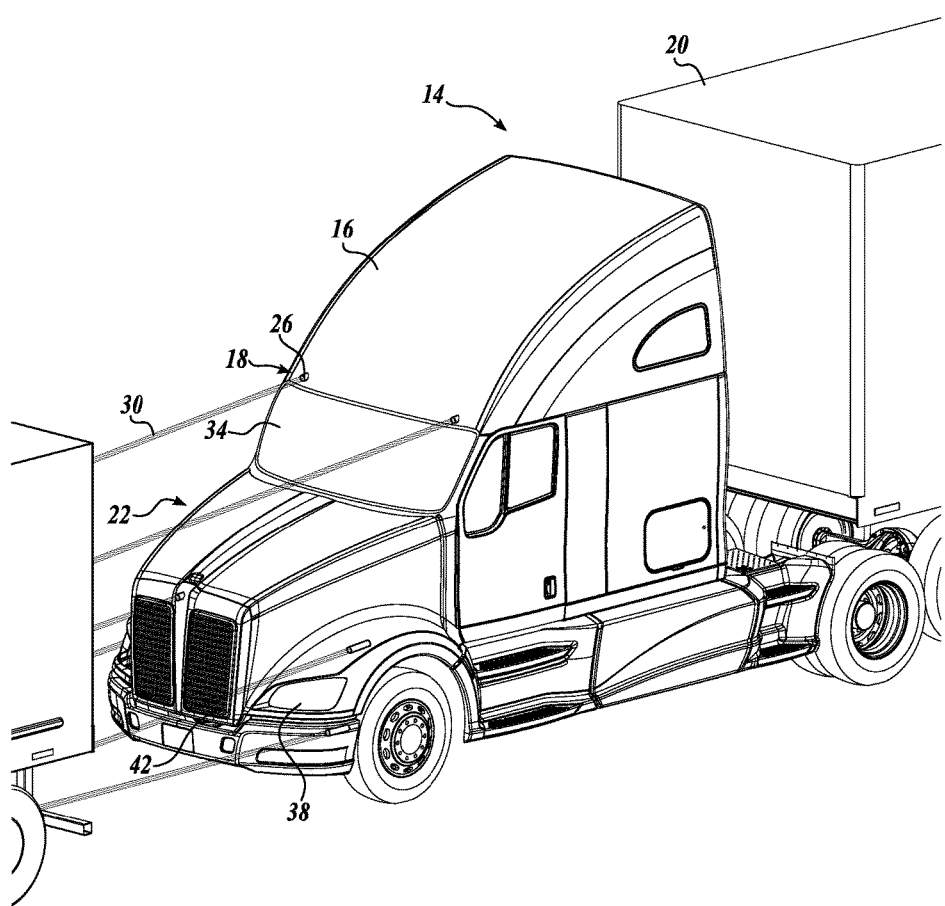
FIG. 2 is an isometric view of the platooning light fence system of FIG. 1.

FIGS. 1-2 depict an exemplary embodiment of a platooning light fence system 10 and corresponding methods configured to communicate to passenger vehicles that the trucks are traveling as a team intentionally running close together and that cut-ins or cut-offs are discouraged. The platooning light fence system 10, which may be used with at least first and second platooning trucks 12 and 14, generally includes an illumination assembly 18 located on at least one of the platooning trucks 12 or 14. The illumination assembly 18, when activated, is generally configured to create a platooning light fence 22 that at least partially surrounds, engulfs, and/or extends between the tractor 16 of the second or trailing platooning truck 14 and the trailer 20 of the first or leading truck 12.

An exemplary embodiment of the illumination assembly 18 with reference to FIGS. 1 and 2 will now be described. The illumination assembly 18 may include one or more light sources 26 that radiate light energy as a directional projection, or a beam of light. Preferably, a suitable high intensity light beam source is used, such as a laser light assembly. Any suitable laser light assembly may be used that radiates at least one laser light beam 30 that is visible both in daylight and at night by reflecting off of or being scattered by tiny particle objects such as exhaust, dust, smoke, fog, rain, snow, hail, mist, smog, etc., and/or the other platooning trucks. It can be appreciated that on a roadway with fast-moving, heavy duty vehicles, ample tiny particles will be normally present between the first and second platooning trucks 12 and 14, thereby resulting in a substantially continuous laser light beam(s) 30 extending therebetween. The laser light assembly may also be configured to produce a laser light beam 30 of a suitable color that is indicative of warning, such as orange, red, etc., and may be of a suitable strength such that it is easily noticeable to passenger vehicles in most situations.

As can be appreciated by those skilled in the art, laser light is useful because its coherent nature allows a narrow beam to be produced, which allows the use of optical scanning to draw patterns or images on surfaces or particles without refocusing the beam for the differences in distance. This inherently more focused beam is also extremely visible, and is often used as an effect. The focused beams may also be "bounced" to different positions with mirrors to create laser "sculptures," barriers, etc.

In the illumination assembly 18, a plurality of light sources 26 are secured to the tractor 16 of the second, trailing truck 14 for projecting a plurality of laser light beams 30 toward the trailer 20 of the first or leading truck 12. The laser light beams 30 together define the platooning light fence 22 between and/or around the first and second trucks 12 and 14. The platooning light fence 22 may be any suitable non-destructive barrier-like structure made up of one or more laser light beams 30. For instance, in the embodiment shown in FIG. 2, a plurality of laser light beams 30 extend substantially horizontally between the tractor 16 of the second, trailing truck 14 toward the trailer 20 of the first or leading truck 12 to create the visual appearance of a fence. The plurality of laser light beams 30 are spaced vertically and horizontally to create a fenced or fenced off area in the gap defined between the trucks 12 and 14.

Any suitable number and arrangement of light sources 26 may be used to create a platooning light fence 22 that is noticeable to passenger vehicles nearby and indicative that the gap defined between the trucks 12 and 14 should be avoided. For instance, the illumination assembly 18 may include one or more light sources 26 located above and spaced horizontally along the windshield 34 of the tractor 16 of the trailing truck 14 that are directed forwardly toward the trailer 20 of the leading truck 12. In addition or in the alternative, the illumination assembly 18 may include one or more light sources 26 located in or near the headlights 38 of the tractor 16 of the second, trailing truck 14 that are directed forwardly toward the trailer 20 of the leading truck 12. In addition or in the alternative, the illumination assembly 18 may include one or more light sources 26 located around or near the grill 42 of the tractor 16 of the second, trailing truck 14 that are directed forwardly toward the trailer 20 of the leading truck 12.

The illumination assembly 18 may instead include one or more light sources 26 at any other location of the tractor 16 of the second, trailing truck 14, such as the hood, the bumper, etc. Moreover, the light sources 26 may be spaced close together or far apart, or may vary in pattern and spacing depending on their location. Further, one or more mirrors may be used to enhance or increase the effect of the laser light beams 30. For instance, in the embodiment depicted in FIG. 2, a plurality of mirrors may be provided on the trailer 20 of the leading truck 12 that are configured to reflect and re-direct the laser light beams 30 back toward the tractor 16 of the trailing truck 14. In such a configuration, the resulting platooning light fence 22 may resemble a webbed-like, closed off area highly visible to passenger vehicles. In addition or in the alternative, the mirrors may be configured to reflect and re-direct the laser light beams 30 back along the sides of the tractor 16 of the trailing truck 14 to at least partially engulf the trailing truck 14. Regardless, the light sources 26 together create a non-destructive platooning light fence 22. The platooning light fence 22 communicates even to unfamiliar passenger vehicles to avoid the gap between the platooning vehicles. At the same time, the platooning light fence 22 can be penetrated by a passenger vehicle if needed without causing any harm to the vehicle or trucks.

Figure 3:
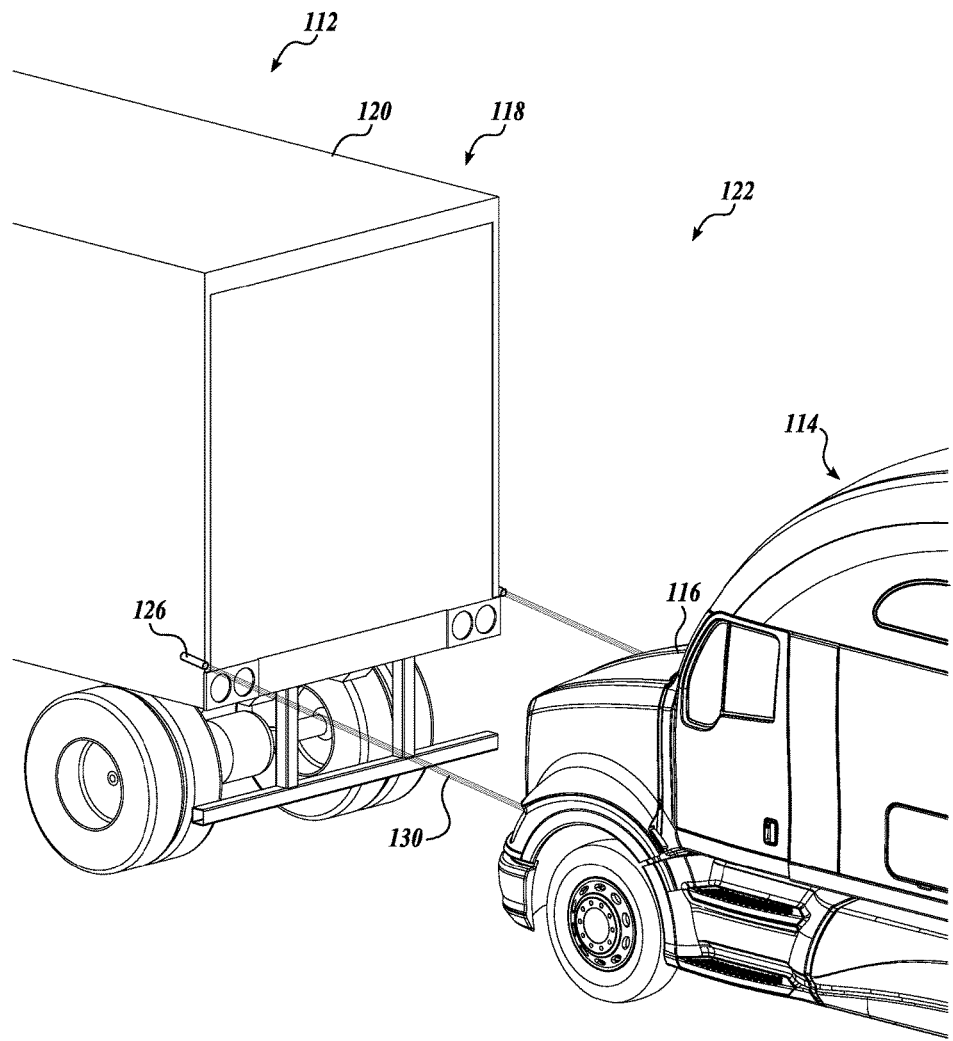
FIG. 3 is an isometric view of a platooning light fence system formed in accordance with an alternative exemplary embodiment of the present disclosure.

In an alternative embodiment of FIG. 3, where like parts are labeled with like references numerals except in the '100 series, an illumination assembly 118 having light sources 126 are secured to the trailer 120 of the leading truck 112 for projecting a plurality of laser light beams 130 toward the tractor 116 of the trailing truck 114. The light sources 126 may be positioned around the bottom trailing edge of the trailer 120. More specifically, one or more light sources 126 may be positioned on the side surface(s) of the trailer 120 near the bottom trailing edge, and/or one or more light sources 126 may be positioned on the bottom surface of the trailer 120 near the trailing edge.

It should be appreciated that the embodiments of FIGS. 2 and 3 may also be used in combination, with light sources 26 secured to the tractor 16 of the trailing truck 14, and with light sources 126 secured to the trailer 120 of the leading truck 12. Moreover, any other suitable placement, combination of lights sources, mirrors, etc., may instead be used to create a platooning light fence 22, 122 that at least partially surrounds and/or extends between the trailing truck 14 and the leading truck 12.

In both the embodiments of FIGS. 2 and 3, the light sources 26 and 126 may project the laser light slightly downwardly. In this manner, the laser light does not spotlight oncoming traffic or reflect off rearview mirrors of leading vehicles or trucks. In the alternative or in addition thereto, the light sources 26 and 126 may project the laser light only onto the other platooning truck to avoid any interference with other vehicles.

The platooning light fence system 10 creates a platooning light fence 22, 122 between and/or around platooning trucks without requiring any smart technology coordination between the trucks. In this manner, the platooning light fence system 10 can be used with trucks of varied fleets drafting manually or having different communication technologies. In other words, no smart syncing between the platooning trucks is required.

The illumination assemblies 18 and 118 may be activated by any suitable activation assembly 50 (see FIG. 1). For instance, the activation assembly 50 may be a simple mechanical or electrical switch located inside the truck for activation by the driver when the truck is in a platoon. In an alternative embodiment, the activation assembly 50 may include suitable circuitry in an on-board computer system or the like that automatically activates the illumination assembly 18, 118 when the leading truck 12 is electronically synced with the trailing truck 14 in a manner now known or later developed. In that regard, the activation assembly 50 may be in wireless communication with a network 54 (through the on-board computer system or the like) such that a remote computer may send appropriate output signals to activate the illumination assembly 18, 118 when it receives input signals indicating that the leading truck 12 is electronically synced with the trailing truck 14. Any other suitable activation assembly may instead be used.

The detailed description set forth above in connection with the appended drawings is intended as a description of exemplary embodiments of a platooning light fence and are not intended to represent the only embodiments. The representative embodiments described in this disclosure are provided merely as an example or illustration and are not intended to be exhaustive or to limit the claimed subject matter to the precise forms disclosed.

In the foregoing description, numerous specific details are set forth in order to provide a thorough understanding of the exemplary embodiments of the present disclosure. It will be apparent to one skilled in the art, however, that the exemplary embodiments of the present disclosure may be practiced without some or all of the specific details. In some instances, well-known process steps or features have not been described in detail in order not to unnecessarily obscure various aspects of the present disclosure. Further, it will be appreciated that the exemplary embodiments of the present disclosure may employ any combination of features described herein.

The present disclosure uses the phrase "platooning light fence." It should be appreciated that the term "fence" may be understood to include any type of structure formed from the light beams that defines a barrier extending at least between first and second platooning trucks, such as a barricade, blockade, etc. Accordingly, the term "fence" should not be seen as limiting the scope of the claimed subject matter.

The present disclosure may also include references to directions, such as "fore," "aft," "left," "right", "forward," "rearward," "front," "back," "upward," "downward," "lateral," "medial," "in," "out," "vertical," "horizontal," "central," etc. These references, and other similar references in the present disclosure, are only to assist in helping describe and understand the particular embodiment and are not intended to limit the present disclosure to these directions or locations.

The present disclosure may also reference quantities and numbers. Unless specifically stated, such quantities and numbers are not to be considered restrictive, but exemplary of the possible quantities or numbers associated with the present disclosure. Also in this regard, the present disclosure may use the term "plurality" to reference a quantity or number. In this regard, the term "plurality" is meant to be any number that is more than one, for example, two, three, four, five, etc. In an embodiment, "about," "approximately," etc., means plus or minus 5% of the stated value.

Thus, while illustrative embodiments have been illustrated and described, it will be appreciated that various changes can be made therein without departing from the spirit and scope of the invention.

The embodiments of the invention in which an exclusive property or privilege is claimed are defined as follows:

1. A platooning light fence, comprising an illumination assembly having one or more light sources located on at least one of a first platooning vehicle and a second platooning vehicle, each of the one or more light sources configured to radiate a beam of coherent light that extends substantially horizontally and continuously between the first and second platooning vehicles such that the coherent beam of light originates from the at least one of the first platooning vehicle and the second platooning vehicle and terminates at the other of the first platooning vehicle and the second platooning vehicle to create a fenced off area in a gap defined between the first and second platooning vehicles.

2. The platooning light fence of claim 1, wherein each of the one or more light sources are laser light sources.

3. The platooning light fence of claim 2, wherein at least one of the one or more light sources radiates a beam of light slightly downwardly from the at least one of the first platooning vehicle and the second platooning vehicle toward the other of the first platooning vehicle and the second platooning vehicle.

4. The platooning light fence of claim 1, wherein the one or more light sources are located on at least one of a windshield, headlight, grill, bumper, visor, fender, and hood of the second platooning vehicle.

5. The platooning light fence of claim 1, wherein the first platooning vehicle is a truck having a tractor and a trailer, and wherein the one or more light sources are located around a trailing edge of a trailer of the first platooning vehicle.

6. The platooning light fence of claim 1, wherein the one or more light sources are configured to radiate a beam of light that extends substantially horizontally and continuously around at least a portion of the first and second platooning vehicles.

7. A system for deterring passenger vehicles from entering a gap defined between at least a leading platooning vehicle and a trailing platooning vehicle, comprising: an illumination assembly having one or more light sources located on at least one of the leading platooning vehicle and the trailing platooning vehicle, each of the one or more light sources configured to radiate a beam of coherent light that extends substantially horizontally and continuously between the leading and trailing platooning vehicles such that the coherent beam of light originates from the at least one of the leading platooning vehicle and the trailing platooning vehicle and terminates at the other of the leading platooning vehicle and the trailing platooning vehicle to create a fenced off area in the gap defined between the leading and trailing platooning vehicles; and an activation assembly configured to selectively activate the illumination assembly.

8. The system of claim 7, wherein the one or more light sources are laser light sources.

9. The system of claim 8, wherein at least one of the one or more light sources radiates a beam of light slightly downwardly from the at least one of the leading platooning vehicle and the trailing platooning vehicle toward the other of the leading platooning vehicle and the trailing platooning vehicle.

10. The system of claim 7, wherein the one or more light sources are located on at least one of a windshield, headlight, grill, bumper, visor, fender, and hood of the trailing platooning vehicle.

11. The system of claim 7, wherein the first platooning vehicle is a truck having a tractor and a trailer, and wherein the one or more light sources are located around a trailing edge of a trailer of the leading platooning vehicle.

12. The system of claim 7, wherein the one or more light sources are configured to radiate a beam of light that extends substantially horizontally and continuously around at least a portion of the leading and trailing platooning vehicles.

13. The system of claim 7, wherein the activation assembly automatically activates the illumination assembly when the leading platooning vehicle is electronically synced with the trailing platooning vehicle.

14. The system of claim 7, further comprising one or more mirrors located on at least one of the leading platooning vehicle and the trailing platooning vehicle to reflect at least one beam of light back toward the other of the at least one of the leading platooning vehicle and the trailing platooning vehicle.

15. A method for deterring passenger vehicles from entering a gap defined between at least a leading platooning vehicle and a trailing platooning vehicle, comprising activating an illumination assembly to radiate at least one coherent beam of light substantially horizontally and continuously between the leading platooning vehicle and the trailing platooning vehicle such that the at least one coherent beam of light originates from at least one of the leading platooning vehicle and the trailing platooning vehicle and terminates at the other of the leading platooning vehicle and the trailing platooning vehicle to create a fenced off area in the gap defined between the leading and trailing platooning vehicles.

16. The method of claim 15, further comprising the at least one beam of light slightly downwardly from the leading platooning vehicle to the trailing platooning vehicle.

17. The method of claim 15, further comprising radiating the at least one beam of light slightly downwardly from the trailing platooning vehicle to the leading platooning vehicle.

18. The method of claim 15, further comprising radiating the at least one beam of light such that it extends substantially horizontally and continuously around at least a portion of the leading and trailing platooning vehicles.

19. The method of claim 15, further comprising automatically activating the illumination assembly when the leading platooning vehicle is electronically synced with the trailing platooning vehicle.

20. The method of claim 15, further comprising reflecting the at least one beam of light back toward at least one of the leading platooning vehicle and the trailing platooning vehicle.

\* \* \* \* \*